United States Patent

Evangelisti et al.

[15] 3,668,647

[45] June 6, 1972

[54] FILE ACCESS SYSTEM

[72] Inventors: Carlo J. Evangelisti, Jefferson Valley; Larry E. Rittenhouse, Carmel, both of N.Y.

[73] Assignee: International Business Machines Corporation, Armonk, N.Y.

[22] Filed: June 12, 1970

[21] Appl. No.: 45,751

[52] U.S. Cl. ....................340/172.5

[51] Int. Cl. ....................G06f 15/40

[58] Field of Search ....................340/172.5

[56] References Cited

UNITED STATES PATENTS

| | | | |
|---|---|---|---|
| 3,437,998 | 4/1969 | Bennett et al. | 340/172.5 |
| 3,512,134 | 5/1970 | Packard | 340/172.5 |
| 3,510,847 | 5/1970 | Carlson | 340/172.5 |
| 3,408,631 | 10/1968 | Evans et al. | 340/172.5 |

*Primary Examiner*—Paul J. Henon
*Assistant Examiner*—Ronald F. Chapuran
*Attorney*—Hanifin and Jancin and Isidore Match

[57] ABSTRACT

A system is shown wherein, provided with an appropriate file organization, a data file can be read from a disk master file, given the file name, by performing one seek and one read operation. The system employs hash coding to compress a data file name to a disk file address. The disk file is positioned into fixed length blocks where each hashed file address points to a block, the block being as large as one cylinder or as small as one sector. Each block is organized such that it includes a directory for the files contained in the block and also contains the data files. Each entry in the directory contains the data file name and the address of that data file in the block. The process of locating and reading a data file entails the hash coding of a file name to yield a block address, the moving of the read head to the disk area having the block address and the reading of the directory and the remainder of the block to read out the data file. In the directory reading, the data file names are compared in real time, as they are read from the disk, with the name of the desired data file. When a name match occurs, the address of the data file in the block and the address of the next file address are read and stored. As the disk rotates, the desired data file address just read is constantly compared with the active disk address. When a match occurs, the file has been located and is read out. The reading is terminated at the address of the beginning of the next file. If the file name is not found in the directory of the block indicated by the hash coding of the file's name, then the file is not present therein.

10 Claims, 13 Drawing Figures

INVENTORS
CARLO J. EVANGELISTI
LARRY E. RITTENHOUSE

BY Isidore Match
ATTORNEY

FILE ACCESS SYSTEM

BACKGROUND OF THE INVENTION

This invention relates to file access systems. More particularly, it relates to a file access system which provides greatly increased speed of response.

In the presently known technique for organizing a file, a large file directory is provided on disk together with all of the data files. The directory contains the name and address on disk of each data file in the system. In the operation of such conventional system, the directory is read from disk and stored in core (main store). As a search is made for the desired data file name, when a match on a name occurs, the address of the particular data file is employed to perform another seek operation and to read the desired file into core.

The above-described conventional technique requires the following operations: the seeking to the directory on disk and the reading of it into core; the searching of the directory in core for a file name; and the seeking to the data file on disk and reading it into core. Such multiplicity of operations obviously results in slow response to the user.

Accordingly, it is an important object of this invention to provide a data file access system which has an improved response time as compared to the response times of presently known data file access systems.

It is another object to provide a data file access system in accordance with the preceding object, which is simple and which is particularly advantageously employed in interactive graphic systems.

It is further object of the invention to provide a data file access whereby a data file can be read from a disk, given the file name, by the performing of one seek and one read operation.

SUMMARY OF THE INVENTION

Generally speaking, and in accordance with the invention, there is provided a file-access system comprising a master storage file partitioned into blocks, each of the blocks containing a plurality of data files at respective different intrablock addresses thereon and a directory at the head of the block, the directory containing the names of the data files contained in a block and their intrablock addresses respectively. There is further included in the system means for employing the address of a desired data file to cause the pointing by such address to the block in which the data file is contained. Means are included for effecting the reading of a block pointed to by the address of the desired data file, the reading means being arranged to first read the directory in the block and then the intrablock addresses and the located desired data file. Means are provided responsive to the reading of the directory for comparing the desired data file name with the names of the data files in the directory until a match occurs between the desired data file name and the file name in the directory and means are also provided responsive to the occurrence of such match for reading from the directory the address of the data file which is stored. There are also included means, responsive to the reading of the intrablock addresses in the block for comparing the desired data file address with the intrablock addresses until a match occurs and means are provided, responsive to the occurrence of the last-named match, for the reading of the desired data file from the block.

The foregoing and other objects, features and advantages of the invention will be apparent from the following more particular description of a preferred embodiment of the invention, as illustrated in the accompanying drawings.

DESCRIPTION OF A PREFERRED EMBODIMENT

As will be further shown hereinbelow, the invention is a system which, when used with an appropriate file organization, enables the reading of a data file from a master storage file such as a disk, given the file name, by performing one seek and one read operation. The master storage may also be of the strip file, delay line, tape, etc. type. Effectively, it is any storage unit which operates in serial by bit or serial by character mode.

In the operation of the system, hash coding is conveniently employed to compress a file name to a file address. The file is partitioned into fixed length blocks where each hashed file address points to a block. For a typical disk unit, the block could be as large as one cylinder or as small as one sector.

Figures 1A, 1B:
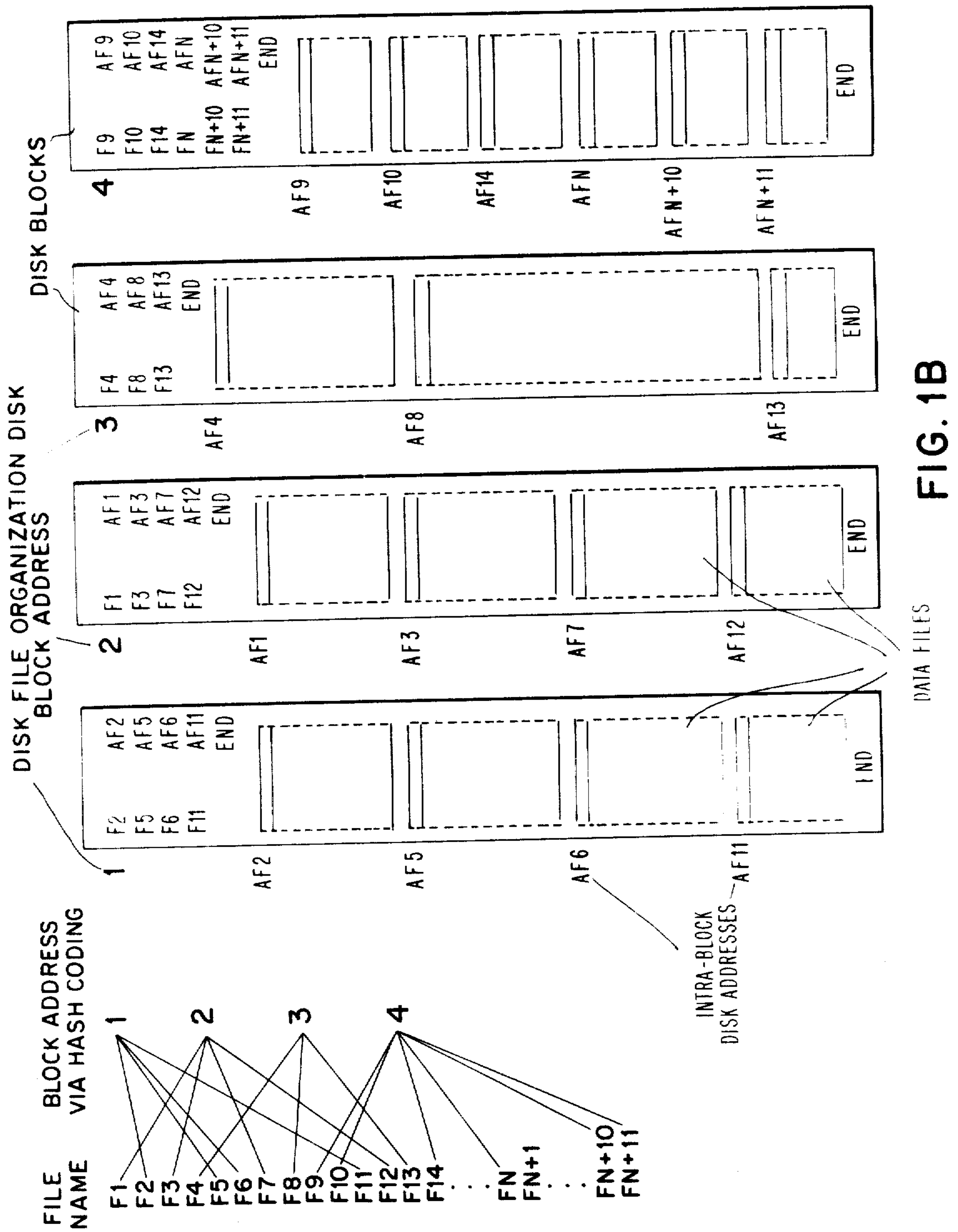
FIGS. 1A and 1B are depictions of a disk file organization according to the invention and illustrates how hash coded data file addresses are utilized to point to the blocks in which the data files are respectively contained.

In FIG. 1, there is shown a master file, i.e., a disk organization, for example, with which the invention can be employed. It is seen therein that the organization for each block contains a directory for the files contained in the block and also contains the data files. Each entry in the directory contains the data file name and the address of that data file in the block.

With a system which is organized as that shown in FIG. 1, the locating and reading of a data file is as follows. The file name is hash coded to yield a block address, the read head is then moved to the disk area having the block address and thereafter the directory is first read. The data file names so read are compared in real time as they are read from the disk with the name of the desired data file. When a name match occurs, the address of the data file in the block and the address of the next file address are read and stored. As the disk rotates, the desired data file address that has just been read is constantly compared with the intrablock addresses. When a match occurs, this signifies that the file has been located and it is read out. The reading is terminated at the address of the beginning of the next file. If the file name is not found in the directory of the block indicated by hash coding of the file's name, then the file is not in the system. The system may be adjusted for different numbers and sizes of files and for specific types of disk or drum units. The hash coding technique can also be adjusted for optimum system performance.

Figure 2:
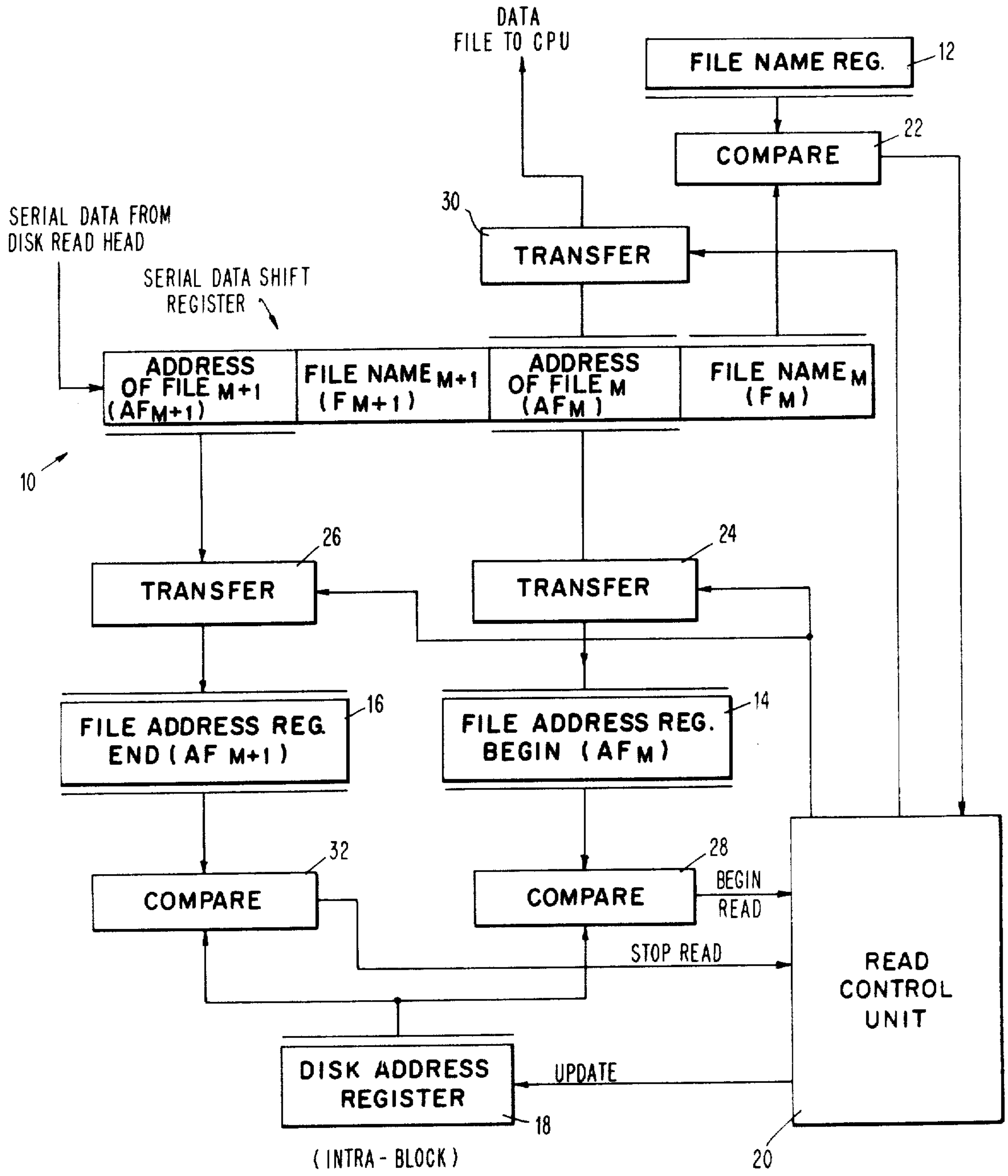
FIG. 2 is a block diagram which conceptually illustrates a structure for carrying out the invention.

In FIG. 2, wherein there is shown an embodiment constructed according to the invention, it is assumed that the hash code calculation and seek and read operations can be performed by conventional hardware and software. Accordingly, structures for performing this calculation and their operations are not shown. The embodiment shown in FIG. 2 effects the processing of the serial data stream from the disk.

The embodiment comprises a four-word shift register 10, the four words in register being from left to right; address of file M+1 ($Af_{M+1}$), file name M+1 ($F_{M+1}$), address of M file ($AF_M$) and file name M ($F_M$). Also included are a file name register 12 for insertion thereinto of a designed file name, a file address register 14 for the storing of the address of the beginning of the data file, a register 16 for the storing of the address of the end of a data file, a disk address register 18 and a read control unit 20.

The embodiment, as shown in FIG. 2, operates after the read head has been moved over to the disk area containing the desired data file. While the head is being positioned, the system is initialized by loading the name of the desired data file ($F_M$) into file name register 12 and by loading the block address into read control unit 20. After the proper block address is detected, the directory of the block is searched in real time for the desired file name. The search is performed by comparing each file name in the directory, i.e., the rightmost word in shift register 10 with the name of the desired file in file name register 12, such comparison being effected in a compare stage 22. Upon the detection of a match in the file names, the intrablock address ($AF_M$) of the desired data file is read from the third word of shift register 10 into file address register begin 14 through transfer stage 24 and the address ($AF_{M+1}$) of the next file is read into file address register end 16 from the leftmost word in shift register 10 through a transfer stage 26.

As the disk rotates, the intra-block disk address register 18 is incremented and its contents are compared with those of file address register begin 14 at each address in a compare stage. When the contents of disk address register 18 matches the contents of file address register begin 14, the data file has been located and is read out to the central processing unit in words through a transfer stage 30. The data is continually read from the disk until the end of the data file is detected by a match in a compare stage 32 between the contents of disk address register 18 and file address register end 16. At this point, the data file has been read out to the central processing unit and the system is ready to search for another data file.

Figure 3A:
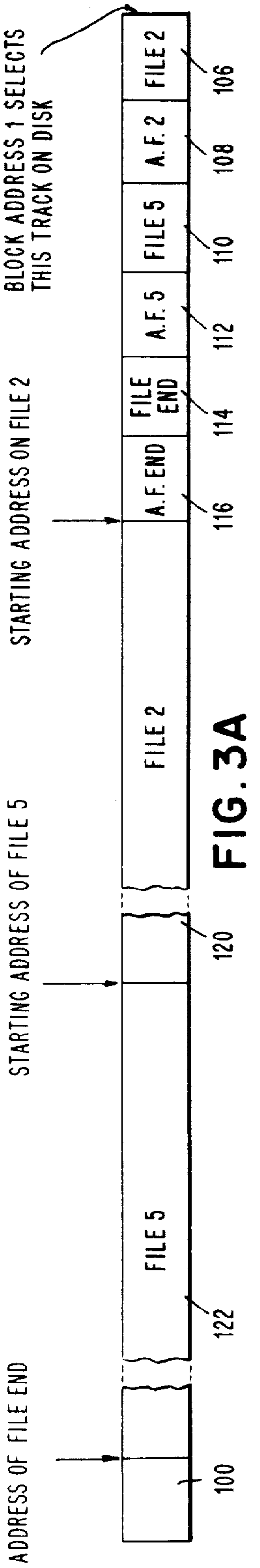
FIGS. 3A, 3B, and 3C are respective depictions of three different tracks on a disk and illustrate the layout of information thereon in accordance with the invention.
Figure 3B:
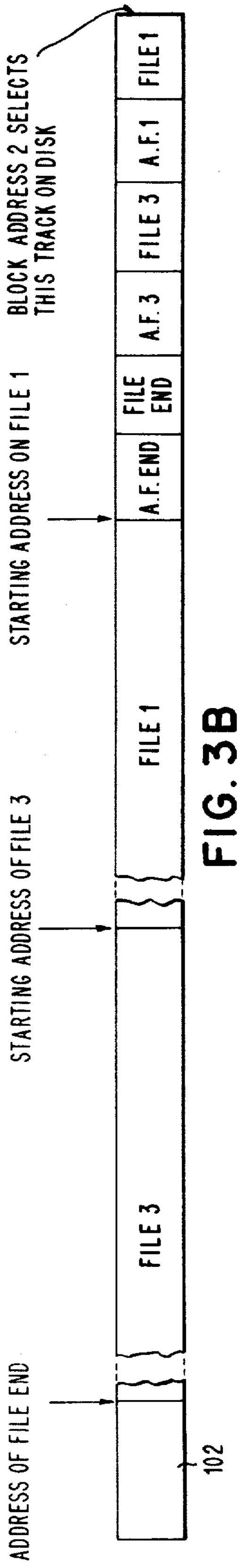
Figure 3C:
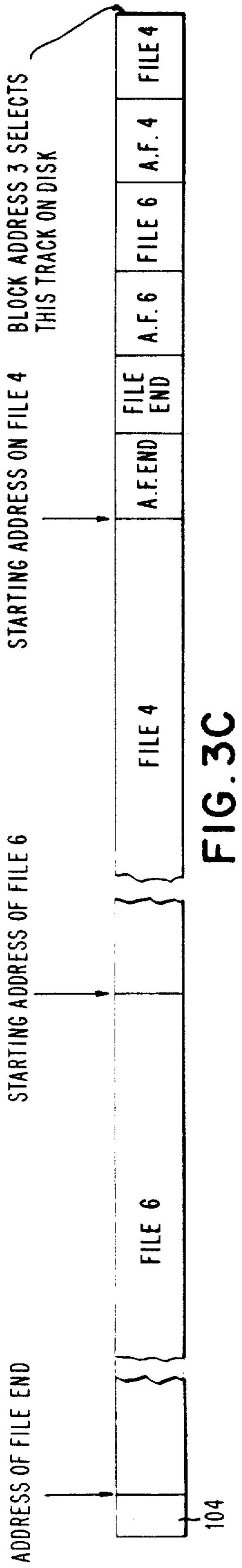

Reference is now made to FIGS. 3A, 3B and 3C and FIGS. 4–7, wherein there is shown an illustrative embodiment of the invention, FIGS. 3A, 3B and 3C respectively, show three tracks on a disk, the tracks being respectively designated by the numerals 100, 102 and 104, these tracks being read from the right to left. For the purposes of simplicity and clarity of explanation, it is assumed that these exist as circular rings of different diameters on the same disk, the circular rings being depicted as being laid out flat in FIGS. 3A, 3B and 3C to indicate clearly the information recorded on each track. In the description of the operation of the embodiment, for ease of explanation and convenience, it is assumed that there are six files, each of these files having a file name which is a binary number consisting of a sufficient number of bits. Recordings on each track are, respectively, serially bit by bit.

It is understood, as has been mentioned hereinabove, that, in order to map a file name to a chosen block address, a software hashing algorithm is employed. Thus, in FIG. 3A, it is assumed that, when files, numbers 2 and 5 are operated upon by the hashing algorithm, they both map to the same block address, i.e., block address number 1 on track 100. Correspondingly, file names, numbers 1 and 3 map to block address number 2 on track 102 and file names number 4 and 6 map to the block address 3 on track 104. Thus, in this embodiment, it is assumed that a "BLOCK" consists of a single track on a disk. It is to be understood that in actual practice a block can consist of more than one track and means, well known in the art, would be provided to read from the first, second and third tracks, etc. until all of the tracks, i.e., those associated with a single-block number had been traversed.

In considering the operation of the reading of a track, and referring to track 100, FIG. 3A in this connection, the read head starts to read the track at its righthand end. As shown in FIG. 3A, the first section of track 100, which is read, is the section designated 106, the latter containing the name of file 2. The next section to be read is the one designated 108, which contains the address on the disk track of file 2. Thereafter, the section 110 of track 100 is read, section 110 containing the name of file 5. The following section 112 contains the starting address of file number 5. Because the illustrative embodiment has been chosen to show only two files on a single track, the next section read by the read head on track 100, i.e., section 114 contains a special symbol of configuration of bits which indicates that there are no more file names in this block. The following section, i.e., section 116, contains the address on the disk of the bit immediately following file five which indicates the file end.

It is to be understood that section 108 on track 100, which contains the starting address of file 2, can be employed to start the reading of the track at that address if file 2 is the one that is desired. The beginning address of file 5 which is in section 112, can be used to terminate the reading of file 2. In other words, it can be regarded as the end address of file 2. If file number 5 is the one that is desired from track 100, then the reading of the track begins with the address shown in section 112 which is the beginning address of file number 5. In this case, the ending address of file 5 would be the address indicated in section 116.

Continuing with track 100, if file number 2 is the one that is desired to be read therefrom, section 120 would be read out bit by bit, assembled into words and transferred to an output device or to a computer as desired. If file number 5 is desired to be read from the track, then the section 122 is read out bit by bit, assembled into words and transferred to an output device or to a computer.

The actual addressing of the bits in sections 120 and 122, starts with the first bit read in section 120 i.e., this first bit is assumed to have the address 0. The next bit, the address 1, the next bit, the address 2, etc., up to the number of bits in sections 120 and 122. Consequently, it is to be appreciated that the address contained in section 108 of track 100 is always 0 as the first file name always has the address 0 associated therewith.

Figures 4, 4A:
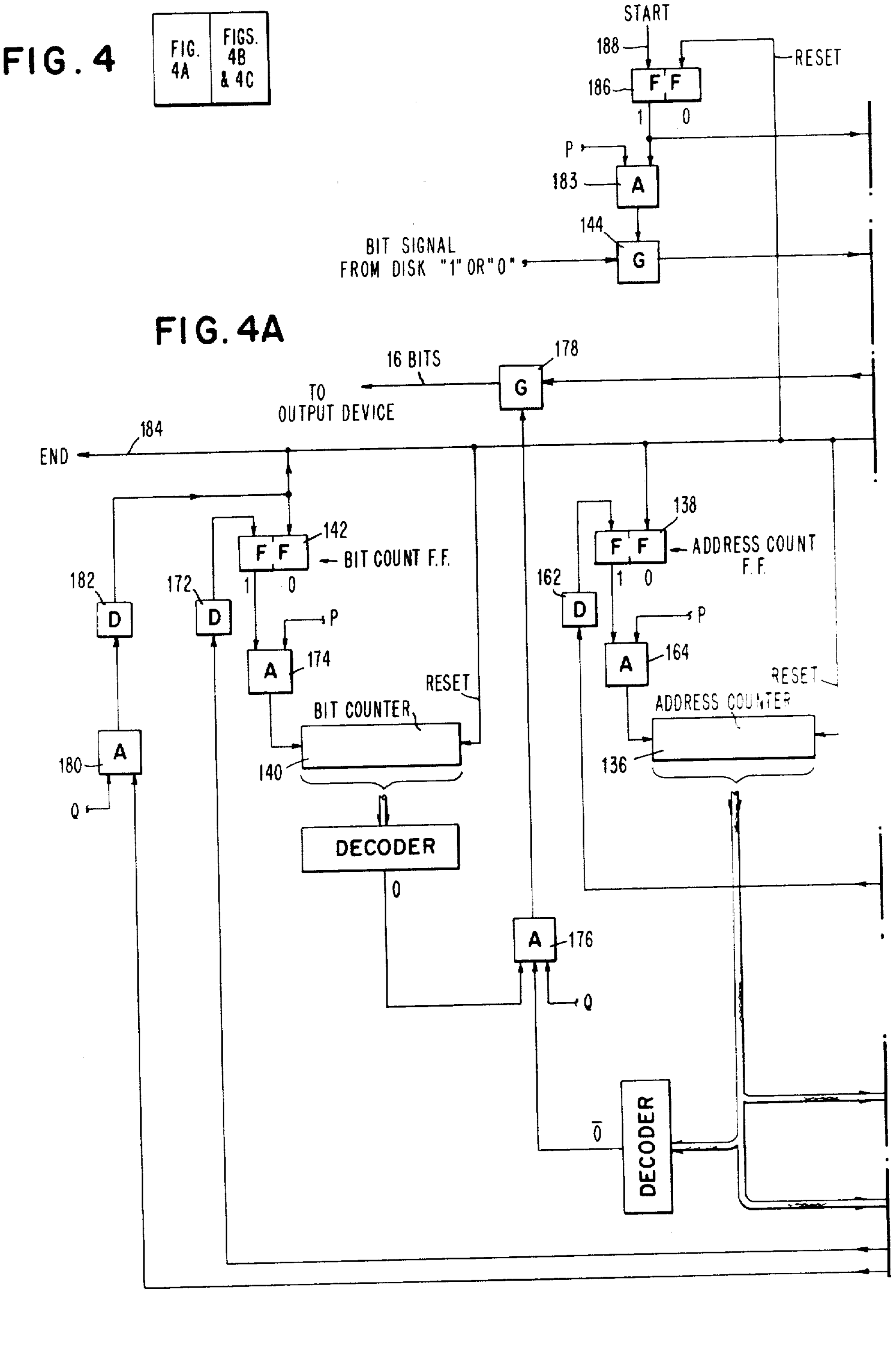
FIGS. 4A, and 4B, taken together as in FIG. 4, constitute an illustrative embodiment constructed in accordance with the principles of the invention.
Figures 4B, 4C:
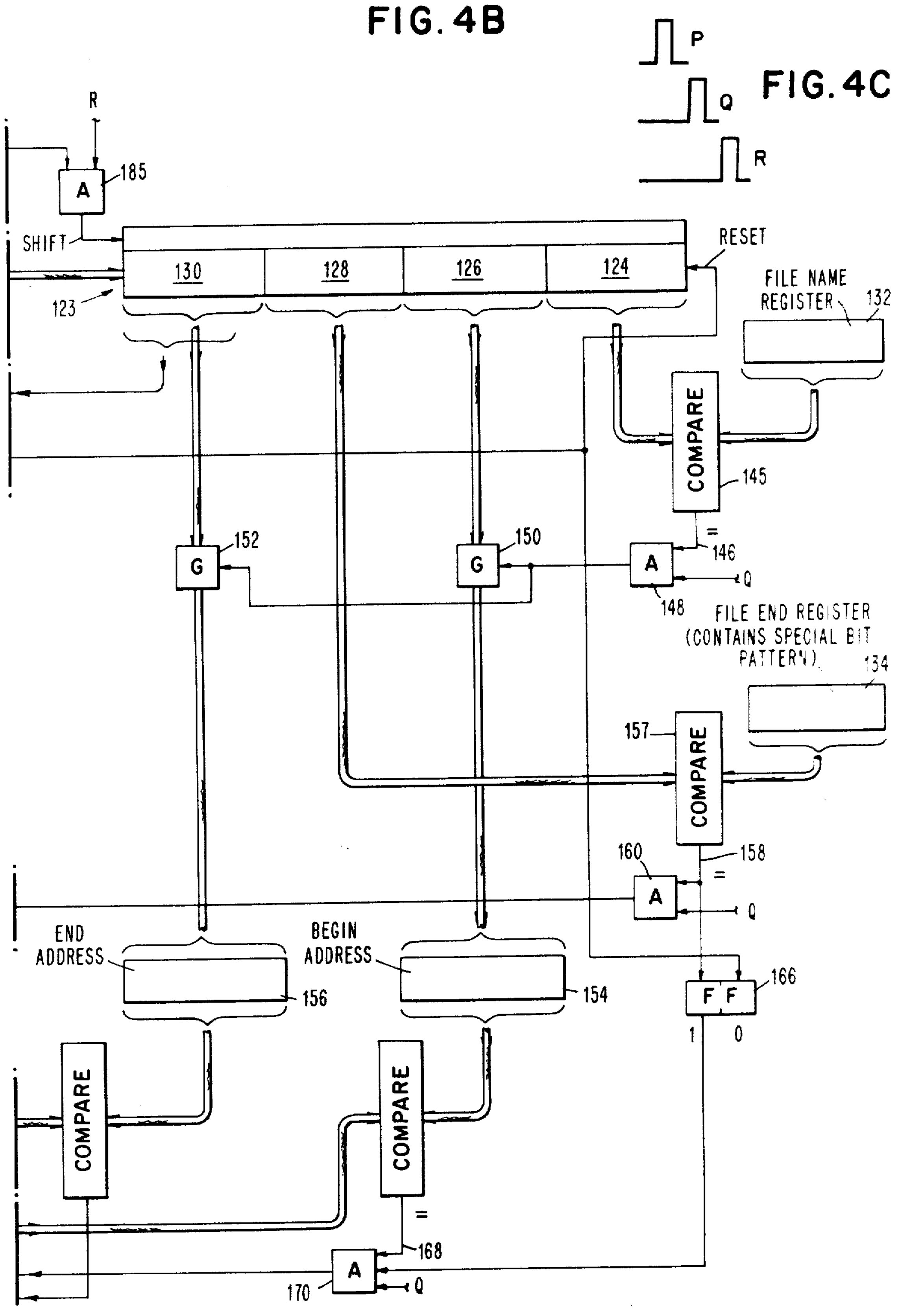
FIG. 4C is a timing diagram of the timing pulses utilized in the operation of the arrangement shown in FIGS. 4A and 4B.
Figure 5:
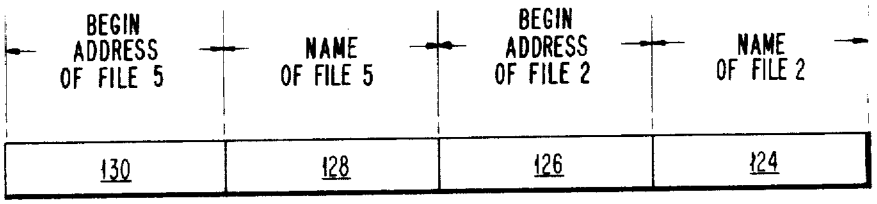
FIG. 5 is a diagram which shows the contents of the shift register in the embodiment shown in FIGS. 4A and 4B when the name of a first data file which exists on a track on a disk is in position to be read from such shift register.

Reference is now made to FIGS. 4A and 4B taken together as in FIG. 4 (there is shown therein that portion of the embodiment which enables the carrying out of the invention). In these FIGS., a shift register 123 is provided which comprises four sections designated by the numerals 124, 126, 128 and 130 respectively. All of the information in a track or block streams through shift register 123 bit by bit from left to right. FIG. 5 illustrates the situation when it is desired to read out file 2 from track 100, FIG. 3A. There are shown in FIG. 5, the time when the information in section 106, of track 100 is in section 124 of shift register 123, the time when the information in section 108 of track 100 is in section 126 of shift register 123, the time when the information in section 110 of track 100 is in section 128 of shift register 123 and the time when the information in section 112 of track 100 is in section 130.

At this juncture, the beginning address and the end address of file 2 can be read from shift register 123 and be employed to control the arrangement shown in FIG. 4.

Figure 6:
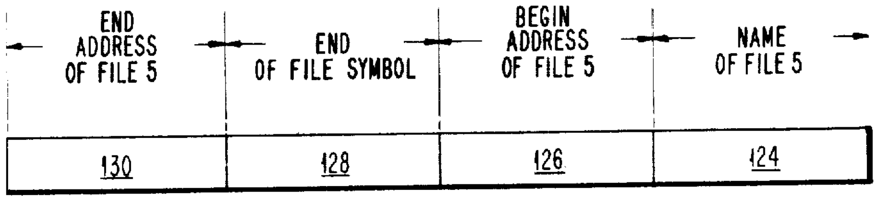
FIG. 6 is a diagram similar to that depicted in FIG. 5 that shows the contents of the shift register in the embodiment shown in FIGS. 4A and 4B when the shift register contains the last name of a file which is on the track of the disk.

FIG. 6 shows the situation which occurs in shift register 123 in the event that file number 5 is to be read from track 100. It is seen that, at this point, the information in section 110 of track 100 is in section 124 of shift register 123, the information contained in section 112 of track 100 is in section 126 of shift register 123, the information contained in section 114 of track 100 is in section 128 of shift register 123, and the information contained in section 116 of track 100 is in section 130 of shift register 123. Relative to the events occurring in shift register 123 as described in connection with FIGS. 5 and 6, it is realized that no structure has been shown for registering the information in the formats shown prior in these Figs. Such structures would suitably be counters for determining at what point compare operations should occur. Such counters are well known and no further depiction thereof is deemed necessary.

To operate the arrangement shown in FIG. 4, three pulses are required, the latter pulses being designated with the letters P, Q and R and illustrated in FIG. 4C. The pulses P, Q and R are derived from the clock pulse (not shown) which exists on the disk track for each bit. The P pulse coincides with the data bit pulse and Q and R pulses exist between the time of the data bit pulse and the succeeding clock pulse. In this connection, the use of clock pulses and data bit pulses on disk tracks are well known in the art and no further explanation thereof is deemed necessary.

In considering the operation of the arrangement shown in FIG. 4, the shift register 123 is reset to 0 when operation is begun. Also, an address counter 136 and a bit counter 140 are initially set to 0 and the flip flops 138, 142, 166 and 186 are initially in their "0" states. The name of the file which is sought is loaded into file name register 132 by suitable means (not shown). A special symbol which indicates the end of a file which, is shown contained in section 114 of FIG. 3A, is loaded into the file end register 134. The "start" pulse, which is derived from the "home address" recording on the disk is applied to a line 188 in order to set flip-flop 186 to its "1" state. Such setting permits the P pulse to be operative through AND circuit 183 to enable a gate 144 and load the present bit from disk into the first flip flop of shift register 123 and the R pulse to be operative through AND circuit 185 to shift the contents of shift register 123 one bit to the right.

As bits are read from the disk, they are loaded into the left end of shift register 123 by the P pulse through AND circuit 183 and gate 144. The Q pulse is used for various control purposes and is not operative until shift register 123 contains a pattern of the format shown in either the pattern shown in FIG. 5 or in FIG. 6.

When the desired file name appears in section 124 of shift register 123, the contents of section 124 matches the contents of file-name register 132 to, thereby, activate a line 146 extending from a compare unit 145. When the next Q pulse appears, an AND circuit 148 is enabled to produce an output therefrom which is applied to a pair of gates 150 and 152. The information contained in section 126 of shift register 123 will be transferred thereby to a begin-address register 154 and the information contained in section 130 of shift register 123 will thereby be transferred to an end-address register 156. The Q pulse is then not again effective until the special symbol which denotes the end of the file appears in section 128 of shift register 123.

When the end of file symbol appears in section 128, at this juncture, the contents of section 128 of shift register 123 will match the contents of file-end register 134 to thereby activate a line 158 which extends from a compare unit 157. Now, when the next Q pulse occurs, AND circuit 160 is enabled to produce an output, such output being delayed by a delay circuit 162 and thereafter setting flip flop 138 to its "1" state, which starts address counter 136. The active state of line 158 is also employed to set flip flop 166 to its "1" state to begin searching for the file.

In this latter connection, the function of flip flop 166 is to delay a possible agreement between the contents of begin-address register 154 and the contents of address counter 136 until the proper time. The proper time for such an agreement to be effective is when the contents of file-end register 134 match with the contents of section 128 of shift register 123. It is to be noted that the beginning address which is stored in begin-address register 154 might be "0" and this could agree with the contents of address counter 136 which, as has been stated above, is initially set to "0."

When flip flop 138 is in its "1" state, the P pulse is operative through an AND circuit 164 to increment address counter 136. When flip flop 142 is in its "1" state, the P pulse is operative through an AND circuit 174 to increment the bit counter 140. In this regard, it is to be noted that it is assumed that bit counter 140 counts from 0 to 15 and then reverts back to 0.

If the contents of begin-address register 154 are other than "0," flip flop 142 is not set to its "1" state until address counter 136 is incremented to the point where its contents agree with the contents of begin-address register 154. The delay circuits 162 and 172 are required in order to delay the setting of flip flops 138 and 142 to their respective "1" states until after the Q pulse ends.

Such delay is necessary because the Q pulse is employed to test the output of bit counter 140. As is further explained hereinbelow, because of timing reasons, it is necessary to test the setting of bit counter 140 each time prior to its incrementing. This testing is effected by the Q pulse, i.e., the Q pulse is applied to an AND circuit 176. If at this point the contents of bit counter 140 are at "0" and the contents of address counter 136 are not at "0," AND circuit 176 is enabled to produce an output which activates a gate 178 to thereby permit the high order 16 bits present in section 130 of shift register 123 to be gated to the output device.

It is to be noted that the end address contained in end-address register 156 has to be a multiple of 16 because the information is arranged in words of 16-bit lengths. When the contents of address counter 136 compare with the end address in end-address register 136, the contents of bit counter 140 will be at "0" and the Q pulse will gate out the last word of the file. The Q pulse is also operative through an AND circuit 180 and a delay circuit 182 to reset flip flops 142, 138 and 166 to their "0" states and also to reset the contents of bit counter 140 to "0." The Q pulse, at this point, also resets the contents of address counter 136, and sections 124–130 of shift register 123 to "0." A signal is also produced on a line 184, which indicates that operations are complete.

Figure 7:
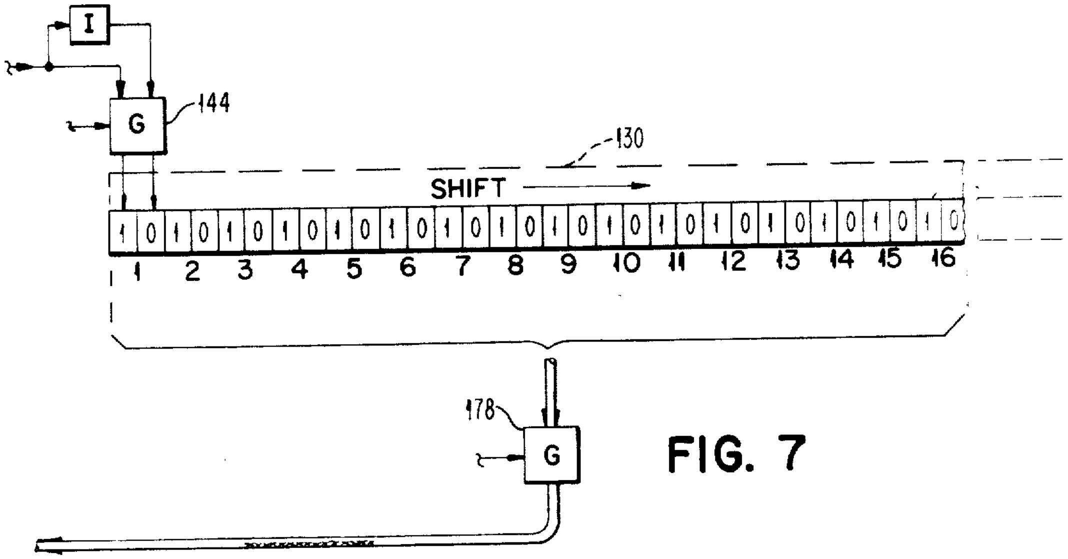
FIG. 7 is a diagrammatic depiction of the leftmost section of the shift register of the embodiment shown in FIGS. 4A and 4B, this FIG. being employed to illustrate the method by which bytes are assembled in this portion of the shift register and transmitted to a central processor unit or to an output device.

Reference is now made to FIG. 7 wherein is illustrated how the high order 16 bits of section 130 of shift register 123 are employed to assemble the word. In this connection, during the clock cycle in which the last bit of the special pattern which indicates the end of the file symbol was shifted into section 128 of shift register 123, the P pulse was the pulse that shifted in the last bit of the special character. During this clock cycle, the contents of section 128 of shift register 123 matched the contents of register 134, to thereby cause the address count flip flop 138 to be set to its "1" state. Also, during the same clock cycle, the R pulse shifted the entire contents of shift register 123 one bit to the right thereby leaving an empty space at the left.

Referring to FIG. 7, it is seen that this empty space is the number one flip-flop in the high order portion in section 130 of shift register 123. In the next clock cycle, the P pulse gates in the first bit of the first data word and also increments address counter 136 to "1." In addition, in this cycle, the bit which was loaded into this number one flip flop is shifted to flip-flop number two. In the next cycle, the second bit of the word is placed in flip flop number one and the address count is incremented to two. This goes on through successive cycles until, at the 16th clock cycle, the 16th bit of the word is loaded into flip flop number one of section 130 of shift register 123 and, at this time, the contents of address counter 126 are advanced to 16. If the bit counter 140 is also operating, instead of being advanced to 16, its contents would revert back to "0." It is thus seen that, during this cycle in which the 16th bit of the word is placed in shift register 123, the Q pulse can be effective through AND circuit 176 to enable gate 178 and permit the 16 bits to be gated to the output device. With this arrangement, 16-bit words are assembled in the 16 high order flip flops of section 130 of shift register 123 and transferred to the output device or central processing unit as desired.

The invention has been described in connection with the obtaining of a single file. It is to be realized however, that within the contemplation of the invention, a plurality of data files can be read in one seek and read operation from a particular block To enable such plurality reading, there would merely be required some duplications of the structures.

An important capability of the invention is the fact that the files may be of variable length, enabling great flexibility of the device.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A file access system comprising:

a master storage file partitioned into blocks, each of said blocks containing thereon a plurality of data files at respective different addresses, and a directory, said directory containing the names of the data files in a block and their respective intrablock addresses;

means for employing data file block addresses to effect the pointing to the block wherein particular data files are contained;

means for effecting the reading of a pointed-to block whereby there is first read said directory and then the remainder of said block, to read out said data files;

means responsive to the reading of a directory for comparing desired data file names with the names of said files in said directory to obtain the intrablock addresses of said desired data files; and means responsive to the obtaining of said addresses and the further reading of said block for comparing said addresses with the intrablock addresses on said block to read out said desired data files from said block.

2. A file access system comprising:

a master storage file partitioned into blocks, each of said blocks containing thereon a plurality of data files at respective different addresses, and a directory, said directory containing the names of the data files in a block and their respective intrablock addresses;

means for employing data file block addresses to effect the pointing to the block wherein particular data files are contained;

means for effecting the reading of a pointed-to block whereby there is first read said directory and then the remainder of said block, to read out said data files;

means responsive to the reading of a directory for comparing desired data file names with the names of said files in said directory to obtain the intrablock addresses of said desired data files;

means responsive to the obtaining of said addresses and the further reading of said block for comparing said addresses with the intrablock addresses on said block to read out said desired data files from said block; and means responsive to reading out said desired data file from said block and transferring said data file to said output device.

3. A file access system comprising:

a master storage file partitioned into blocks, each of said blocks containing thereon a plurality of data files at respective different addresses, and a directory at the head of said block, said directory containing the names of the data files in a block and their respective intrablock addresses;

means for coding the intrablock addresses of said data files in a plurality of groups to produce pointers to the blocks in which said files are respectively contained;

means for effecting the continuous reading of a pointed-to block wherein a desired data file is contained whereby there is first read said directory and then the remainder of said block to read out said data file;

means responsive to the reading of said directory for comparing the intrablock address of said desired data file with the address in said directory to obtain the intrablock address of said desired data file;

means responsive to the obtaining of the address of said desired data file and the further reading of said block for comparing said address with the intrablock addresses on said block to locate said desired data file; and means responsive to the locating of said data file for reading out said data file and for transferring said data file to an output device.

4. A file access system as defined in claim 3 wherein a hash coding algorithm is utilized by said intrablock address coding means to produce said pointers.

5. A file access system as defined in claim 3 wherein said means for comparing said desired data file name with said file names in said directory comprises a file name register for containing said desired data file name and means for comparing the contents of said last-named register and said file names to obtain a match therebetween to thereby obtain the intrablock address of said desired data file.

6. A file access system as defined in claim 5 wherein said means for comparing said obtained address with said intrablock addresses comprises a register for storing said obtained address and means for comparing said stored address with said intrablock addresses to obtain a match therebetween and to thereby locate said desired data file.

7. A file access system as defined in claim 3 and further including means for indicating the end of said desired data file.

8. A file access system as defined in claim 7 wherein said end of file indicating means includes a register for containing the address of the file in said blocks immediately following said desired data file, and means for comparing the contents of said register with the intrablock address of said following data file.

9. A file access system as defined in claim 3 wherein said master storage file is of the disk type.

10. A file access system as defined in claim 3 wherein said master storage file is of the drum type.

* * * * *